(12) United States Patent
Albrecht (10) Patent No.: US 7,311,791 B2
(45) Date of Patent: Dec. 25, 2007

(54) SAFETY LINER HAVING A VALVE FOR A VEHICLE TIRE AND METHOD OF USE

(76) Inventor: Donald Albrecht, 2314 Santa Monica Blvd., Santa Monica, CA (US) 90404

( * ) Notice: Subject to any disclaimer, the term of this patent is extended or adjusted under 35 U.S.C. 154(b) by 444 days.

(21) Appl. No.: 10/984,003

(22) Filed: Nov. 9, 2004

(65) Prior Publication Data

US 2006/0096688 A1    May 11, 2006

(51) Int. Cl.
*B60C 5/00* (2006.01)
*B60C 5/02* (2006.01)
*B29D 23/24* (2006.01)

(52) U.S. Cl. ............... 156/110.1; 152/331.1; 152/339.1; 152/510; 152/511

(58) Field of Classification Search ............ 152/331.1, 152/339.1, 337.1, 340.1, 341.1, 342.1, 450, 152/510, 511, 512; 156/110.1
See application file for complete search history.

(56) References Cited

FOREIGN PATENT DOCUMENTS

| | | | |
|---|---|---|---|
| BR | 9901722 | * | 10/2000 |
| DE | 3623837 | * | 2/1987 |
| FR | 2540960 | * | 8/1984 |
| JP | 05193305 | * | 8/1993 |
| SU | 861112 | * | 9/1981 |

* cited by examiner

*Primary Examiner*—Justin R. Fischer
(74) *Attorney, Agent, or Firm*—Timothy Thut Tyson; Freilich, Hornbaker & Rosen (57) ABSTRACT

A safety liner (20) for a vehicle tire (500) includes a tubular body (22) having a one-way valve (24). A service valve (50) is selectively insertable into the one-way valve (24). Tubular body (22) is compressible into a flattened circular shape by a compressive force, and when the compressive force is removed, the tubular body (22) resiliently assumes its original toroidal shape. Safety liner (20) is installed in the cavity (503) of vehicle tire (500) as the vehicle tire (500) is being installed on the tire rim (502). If a blowout or other leak occurs, safety liner (20) will cause the shape of vehicle tire (500) to be retained at a reduced profile.

9 Claims, 12 Drawing Sheets

Fig. 1

PRIOR ART

SAFETY LINER HAVING A VALVE FOR A VEHICLE TIRE AND METHOD OF USE

TECHNICAL FIELD

The present invention is directed generally to tubeless tires for vehicles, and more particularly to a safety liner which is inserted inside the tubeless tire. In the event of a blow out, the safety liner supports the tubeless tire at a reduced profile allowing a motorist to safely stop or continue driving at a reduced speed to a service station.

BACKGROUND ART

Internal safety structures for vehicle tires are well known in the art. These devices are designed to mitigate against the effects of a blowout.

U.S. Pat. No. 2,560,609 shows a tire that is normally supported by an inner tube which is inflated through a first valve in the wheel rim. The inner tube has an added internal tube which expands to fill the tire in case the regular inner tube becomes punctured or torn from a blow out. The internal tube is inflated through a second valve in the wheel rim.

U.S. Pat. No. 4,008,743 illustrates a tubeless tire that is inflated through a first valve in the wheel rim. An inner tube is added inside the tire and inflated to partially fill the volume of the tire through a second valve in the wheel rim. If the tire loses pressure, the inner tube expands to provide emergency support between the tire tread and the wheel rim.

U.S. Pat. No. 4,153,095 shows a small inner tubeless tire installed inside a larger outer tubeless tire. In one embodiment, the outer tire is inflated through a first valve in the wheel rim between the beads for the outer and inner tires and the inner tire is inflated through a second valve in the wheel rim. In another embodiment, the inner tire is inflated through a valve in the tire rim and the outer tire is inflated by a hypodermic needle through its sidewall.

U.S. Pat. No. 4,216,809 discloses a tubeless tire mounted on a wheel rim that is inflated through a first valve in the rim. An inner tube is inserted inside the tire and is inflated to partially fill the volume of the tire. The inner tube is inflated through a threaded opening in the rim by a needle inflator through a second valve in the wall of the inner tube having a structure similar to that found in a sports balls. After the inner tube is inflated, the needle is withdrawn from the second valve in the inner tube and the hole in the wheel rim is closed with a threaded plug. The tubeless tire may then be inflated through the first valve.

U.S. Pat. No. 6,557,604 shows a tubeless tire mounted on a wheel rim. A toroidal safety liner is inserted inside the tubeless tire. The safety liner is fabricated of a resilient material and has a small hole in its side. When the safety liner is compressed, air passes out of the small hole. When the compressive force is removed, the safety liner resiliently assumes its original toroidal shape as air passes into it through small hole in its side. During assembly of the wheel, the safety liner is compressed and a plug is used to close the small hole and keep the safety liner compressed. One bead of the tubeless tire is installed on the wheel rim and the compressed safety liner is inserted inside the tire. Before the second bead is installed on the rim, the plug is removed allowing the safety liner to slowly return to its toroidal shape. Before this can happen fully, the second bead is installed on the rim. The safety liner finally assumes its toroidal shape inside the assembled wheel. If a blowout or other leak occurs, the safety liner maintains the shape of the tire for a period of time as the air inside the safety liner slowly leaks out of the small hole.

DISCLOSURE OF INVENTION

The present invention is directed to a tubular safety liner for a tubeless tire for a vehicle. The safety liner prevents the tubeless tire from completely collapsing and releasing the tire beads from the rim upon a blowout or other sudden loss of pressure. It has a volume that is only a portion of the volume inside the tubeless tire when it is normally inflated. Whenever the tire deflates, the toroidal safety liner supports the tire surface sufficiently to allow slow speed operation and presses against the beads of the tire to keep them in place on the wheel rim.

The safety liner is constructed from a material having a memory that causes it to return to a toroidal shape after being deflected. The safety liner is inserted in the tire in a compressed state as the tubeless tire is assembled on a wheel rim. A one-way valve in the safety liner allows the compressed air inside the tire to flow into the liner as it returns to toroidal shape. After the safety liner is full, air inside the liner cannot get out because of the one-way valve which only allows air to flow in. After a blowout or other loss of pressure, the partially deflated tire allows the driver to proceed slowly to a service station for a repair.

After a tire is worn out, the toroidal safety liner may be removed and reused in another tire. Or, if the safety liner is punctured, it may be repaired in the same manner as a tire.

An advantage of the safety liner is the fact that one size liner fits a variety of tire and rim models. For example, one size safety liner can be used with most 14 inch rims. Another can be used with most 15 inch rims.

In accordance with a preferred embodiment of the invention, a safety liner for a vehicle tire includes a resilient hollow tube-like body in the form of a toroidal tube having a one-way valve. The body is fabricated from a resilient material and has a normal toroidal shape. The body is compressible into a flattened substantially circular shape by a compressive force, and when the compressive force is removed, the body resiliently returns to its normal toroidal shape with air passing through the one-way valve.

In accordance with an important aspect of the invention, when in its toroidal state, the body is shaped and dimensioned to circumferentially fit loosely inside the internal cavity of the vehicle tire. That is, the body fills a portion of the internal cavity of the vehicle tire.

In accordance with an important feature of the invention, the body includes abutting layers of rubber and tire casing fabric. The body is resilient, and after compression will slowly expand to its normal toroidal shape. The body is more rigid than a conventional tire tube.

In accordance with another important aspect of the invention, the one-way valve includes a ball in a cage that provides virtually no resistance to the passage of air when the air inside the safety liner is at a lower pressure than air outside the safety liner. On the other hand, the one-way valve substantially stops air flow in the opposite direction when the air inside the safety liner is at a higher pressure than the air outside the safety liner and the ball is pushed against the valve seat.

In accordance with another important aspect of the invention, the one-way valve is located entirely within the tube so that the outer surface of the safety liner is smooth allowing the tube to freely move about the cavity inside the tire.

In accordance with another important aspect of the invention, a thread is provided adjacent the outer surface of the one-way valve allowing a service valve to be removably attached. The tube can then be inflated and deflated in a normal manner using an external source of compressed air or vacuum.

Other features and advantages of the present invention will become apparent from the following detailed description, taken in conjunction with the accompanying drawings, which illustrate, by way of example, the principles of the invention.

MODES FOR CARRYING OUT THE INVENTION

Figure 1:
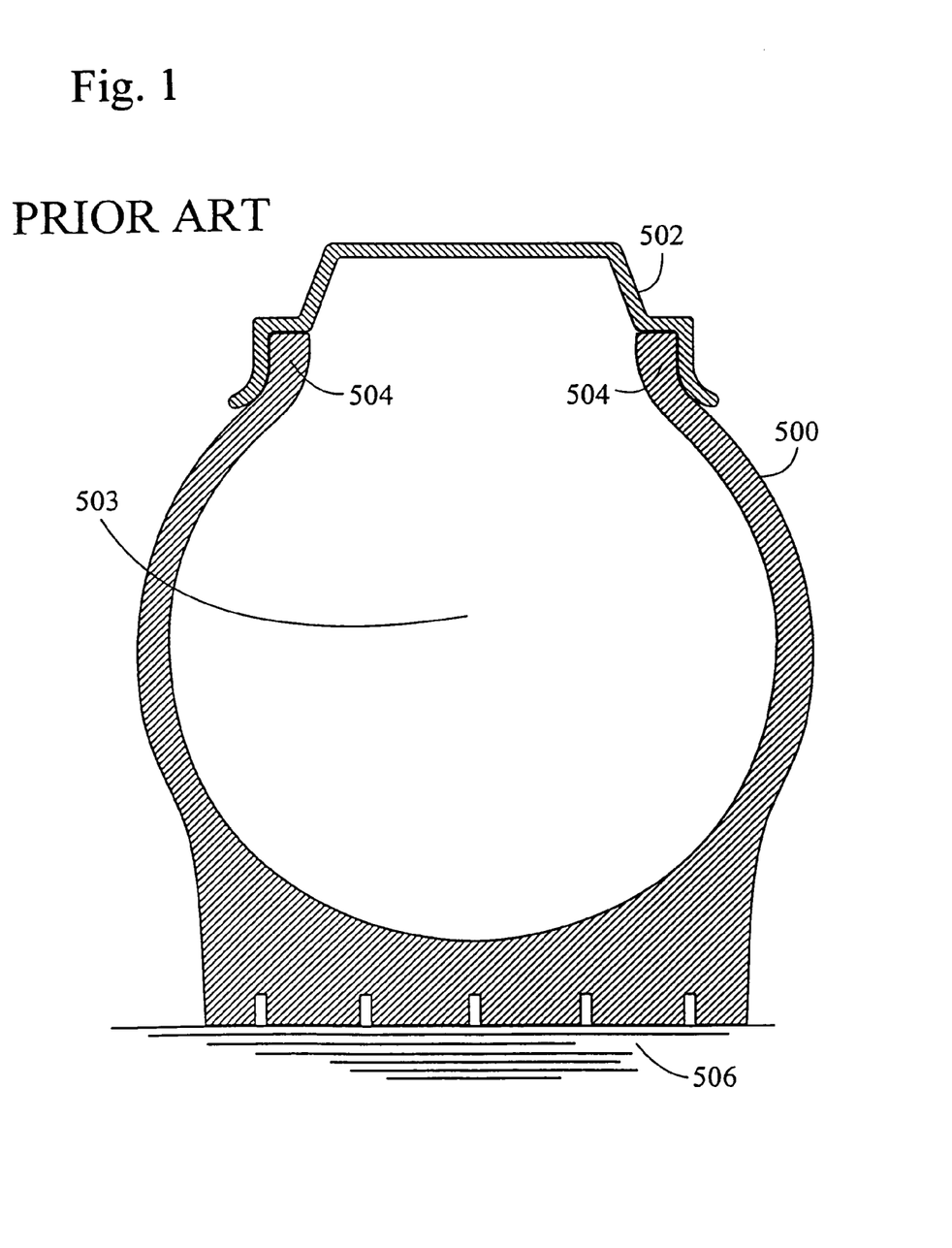
FIG. 1 is a cross-sectional view of a prior art vehicle tire and tire rim.

FIG. 1 illustrates a cross-sectional view of a prior art vehicle tire 500 and tire rim 502. The vehicle tire 500 is installed upon tire rim 502 and the internal cavity 503 is filled with air so the beads 504 firmly abut the tire rim. Vehicle tire 500 is shown resting upon a road 506.

Figure 2:
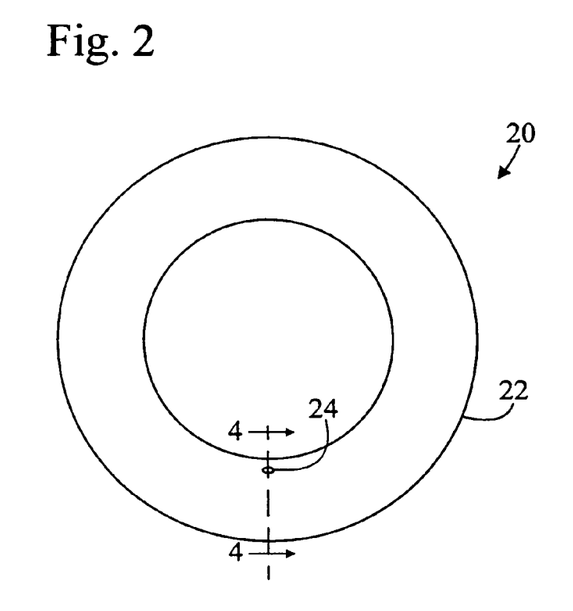
FIG. 2 is a reduced side elevation view of a safety liner for a vehicle tire in accordance with the present invention.
Figure 3:
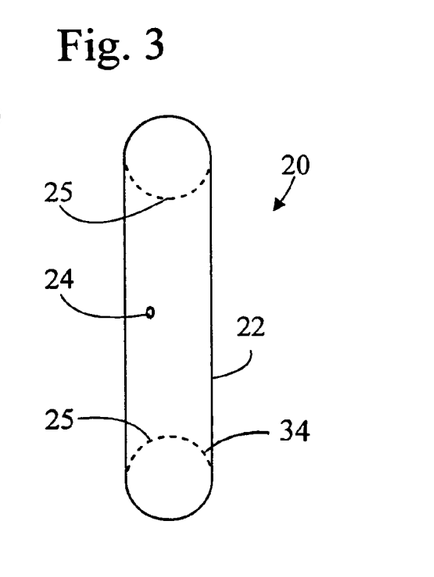
FIG. 3 is a reduced end elevation view of the safety liner.

FIGS. 2 and 3 illustrate reduced side elevation and end elevation views, respectively, of a safety liner for a vehicle tire in accordance with the present invention, generally designated as 20. Safety liner 20 includes a hollow tubular body 22 (i.e. a toroidal tube) having a one-way valve 24. When tubular body 22 is in a toroidal shape, tubular body 22 has an inside portion 25 (dashed line in FIG. 3). The one-way valve is disposed on inside portion 25 and is substantially flush with the outer surface 34 of tubular body 22. In a preferred embodiment, one-way valve 24 is located in about the position shown in FIGS. 2 and 3. Positioning one-way valve 24 in this manner ensures that when tubular body 22 is compressed and inserted into internal cavity 503 of a vehicle tire 500, one-way valve 24 is near tire rim 502 and is therefore accessible (refer also to FIG. 10). When in a toroidal shape, tubular body 22 is shaped and dimensioned to circumferentially and loosely fit inside tire cavity 503 of vehicle tire 500 (FIG. 1).

The loose fit is an advantage of the present invention. The safety liner 20 should not interfere with the flexing of the sidewall of the tubeless tire during normal inflated conditions. This is achieved in three ways. The safety liner has an inner diameter substantially the same as the diameter of the wheel rim. This holds the safety liner against the wheel rim and away from the walls of the tubeless tire. The safety liner has a cross-sectional diameter that is less than the cross-sectional diameter of the tubeless tire. This also keeps the walls of the safety liner away from the walls of the tubeless tire. The safety liner does not have a valve stem passing through the wheel rim that would hold it in place with reference to the wheel rim. This allows the safety liner to rotate inside the tubeless in response to any bumping by the sidewalls of the tubeless tire.

The loose fit is particularly advantageous when the safety liner is actually carrying the load because of a blowout or other deflation of the tubeless tire. The safety liner will then scuff against the side walls and outer wall of the tubeless tire at the tread patch where the tire contacts the road moving it in a circumferential direction with respect to the tire. If a valve were present from the safety liner through the rim as is typically found in the prior art, stresses would occur at the connection of the valve to the safety liner which would shorten the working life of the safety liner and might cause premature failure.

Figure 4:
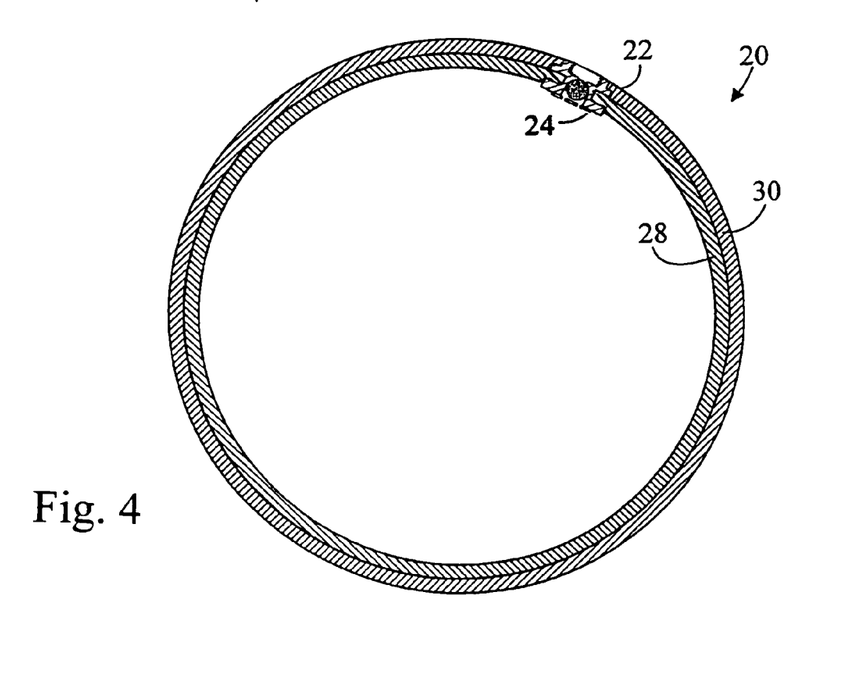
FIG. 4 is a cross-sectional view along the line 4-4 of FIG. 2.

FIG. 4 is an enlarged cross-sectional view along the line 4-4 of FIG. 2. In a preferred embodiment, hollow body 22 is comprised of an inner rubber tube 28 and an outer layer of tire casing fabric 30. However, the layers could also be reversed with the rubber tube 28 on the outside and the tire casing fabric 30 on the inside. It may be appreciated that other resilient materials such as a polymer could also be used to fabricate safety liner 20. Air enters tubular body 22 through one-way valve 24 which allows tubular body 22 to expand into a normal toroidal state. Tubular body 22 is resilient but also is somewhat ridged (certainly more ridged than a conventional tire tube) when in the expanded toroidal shape.

Figure 5:
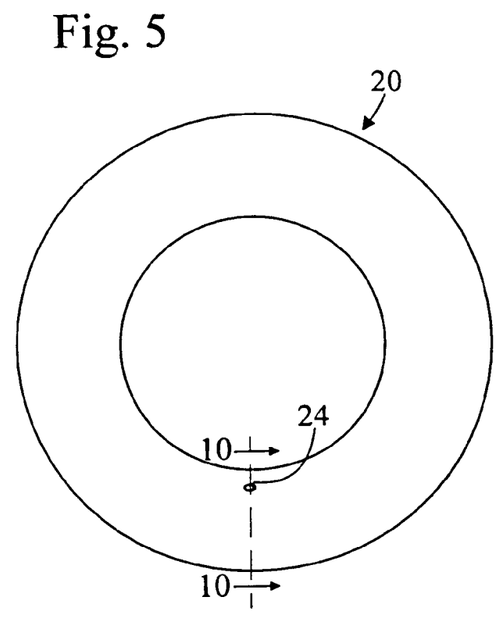
FIG. 5 is a reduced side elevation view of the safety liner in a compressed state.
Figure 6:
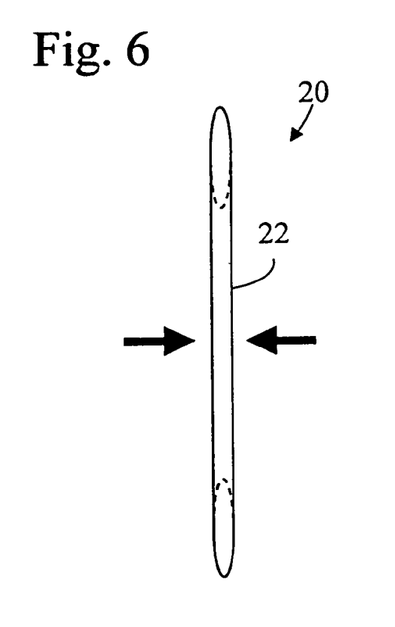
FIG. 6 is a reduced end elevation view of the safety liner in a compressed state.

FIGS. 5 and 6 are reduced side and end elevation views, respectively, of safety liner 20 in a compressed state. Tubular body 22 is compressible into a flattened circular shape by a compressive force such as a weight. When the compressive force is removed, tubular body 22 resiliently assumes a toroidal shape as depicted in FIGS. 2 and 3.

Figure 7:
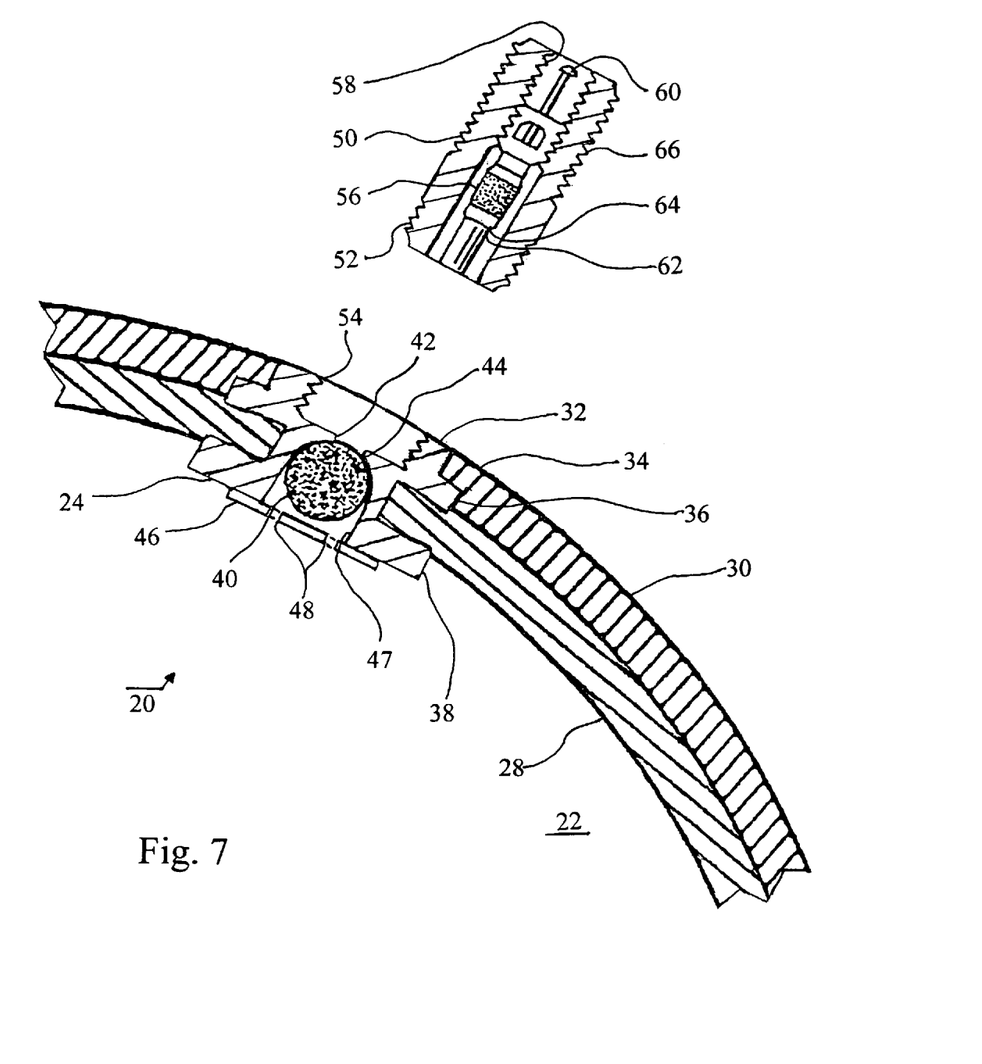
FIG. 7 is an enlarged view of the portion of FIG. 4 adjacent the one-way valve with an added service valve.

FIG. 7 is an enlarged view of the portion of FIG. 4 adjacent the one-way valve 24 with an added service valve 50. The cylindrical valve body 32 is fabricated of plastic or metal and is designed to be substantially flush with the outer surface 34 of the tubular body 22. This minimizes the possibility of the valve scratching the inside surfaces of the tubeless tire. Two annular flanges 36 and 38 hold the valve in position in a hole in the inner rubber tube 28 and outer casing fabric layer 30. A ball 40 of plastic or metal is the only moving part. Ball 40 is moved by air rushing past its sides through an orifice 42 in a valve seat 44. If the air is moving out of safety liner 20, the ball 40 is moved into valve seat 44 stopping air from continuing to move out of safety liner 20. This is the position shown in FIG. 7. When the air moves in the opposite direction, a plate 46 keeps ball 40 in valve cage 47. Holes 48 are provided in plate 46 to allow air to move through plate 46.

The auxiliary service valve 50 may be used to manipulate safety liner 20. Service valve 50 has threads 52 which are engaged in complementary threads 54 in one-way valve 24. Service valve 50 is cylindrical. A standard Schrader valve 56 is installed in the bore 58. The Schrader valve 56 is only open when stem 60 is depressed which pushes down a seal 62 from its seat 64 against the action of an internal spring allowing air to pass through the middle.

Figure 8:
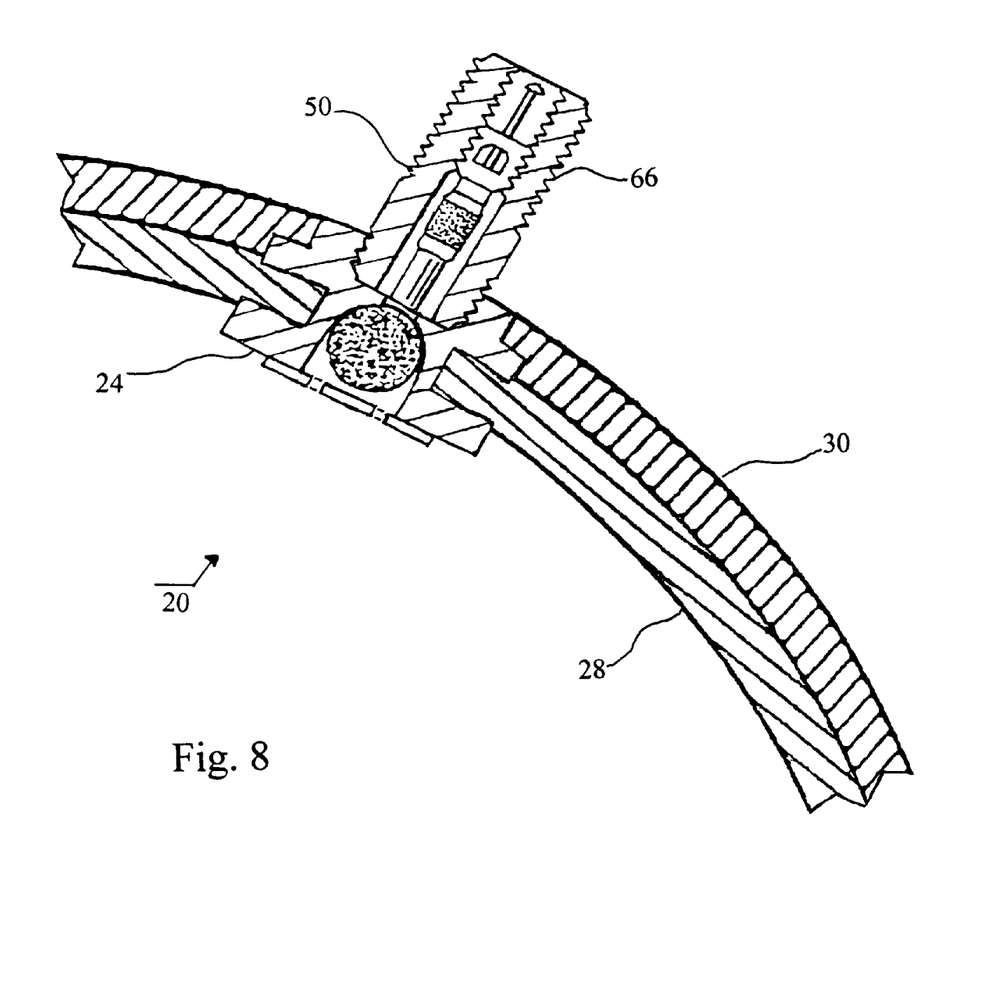
FIG. 8 is a sectional view similar to FIG. 7 with the service valve installed in the one-way valve.

FIG. 8 is a sectional view similar to FIG. 7 with the service valve 50 installed in one-way valve 24. An air supply hose may be screwed on the external threads 66 of the service valve 50 for inflating or deflating safety liner 20 as desired. For example, safety liner 20 may be assembled with the aid of service valve 50. A hole is punched in an inner rubber tube 28. The one-way valve 24 is installed in the hole and the service valve 50 is installed in the one-way valve. Compressed air is supplied through service valve 50 to inflate inner rubber tube 28 to make it rigid. Outer casing fabric layer 30 may then be applied uniformly to the outer surface of inner rubber tube 28 and around one-way valve 24. The compressed air may then be sucked out of the inner rubber tube 28 through service valve 50 so safety liner 20 can be vulcanized to permanently attach inner rubber tube 28 and outer casing fabric layer 30 together.

Figure 10:
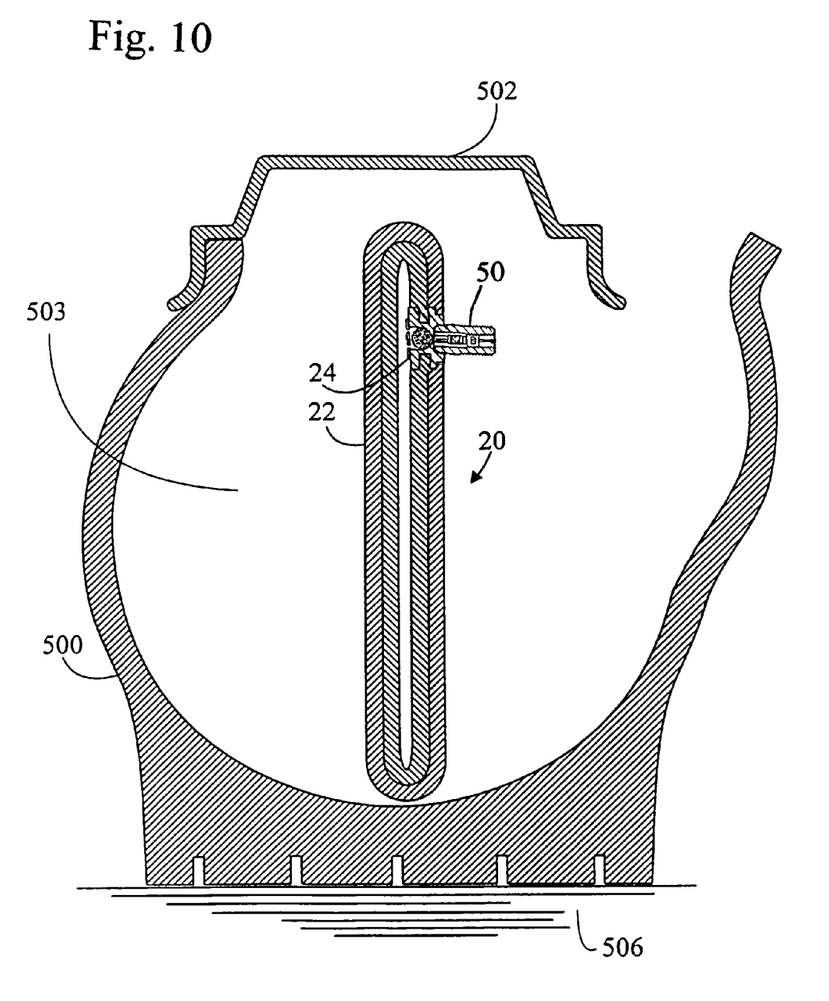
FIG. 10 is a cross-sectional view of a vehicle tire partially installed on a tire rim with the compressed safety liner inserted into the internal cavity of the tire.

Another use for service valve 50 is to facilitate assembly of safety liner 20 and tubeless tire 500 on wheel rim 502 (FIG. 1). One of the beads 504 of tire 500 is forced over an edge of wheel rim 502 as shown in FIG. 10. Prior to forcing the second bead over the edge, all air is pressed or sucked out of safety liner 20 and it is installed inside tire 500 through the narrow crack between the second bead and wheel rim 502. Once safety liner 20 is inside tire 500, partial inflation of safety liner 20 through service valve 50 and one-way valve 24 makes it assume the toroidal shape shown in FIGS. 2 and 3 and thereby minimize the possibility of a portion becoming inadvertently caught between a tire bead and the wheel rim. Service valve 50 is then removed from one-way valve 20. The second bead of tire 500 can then be installed on wheel rim 502.

Figure 9:
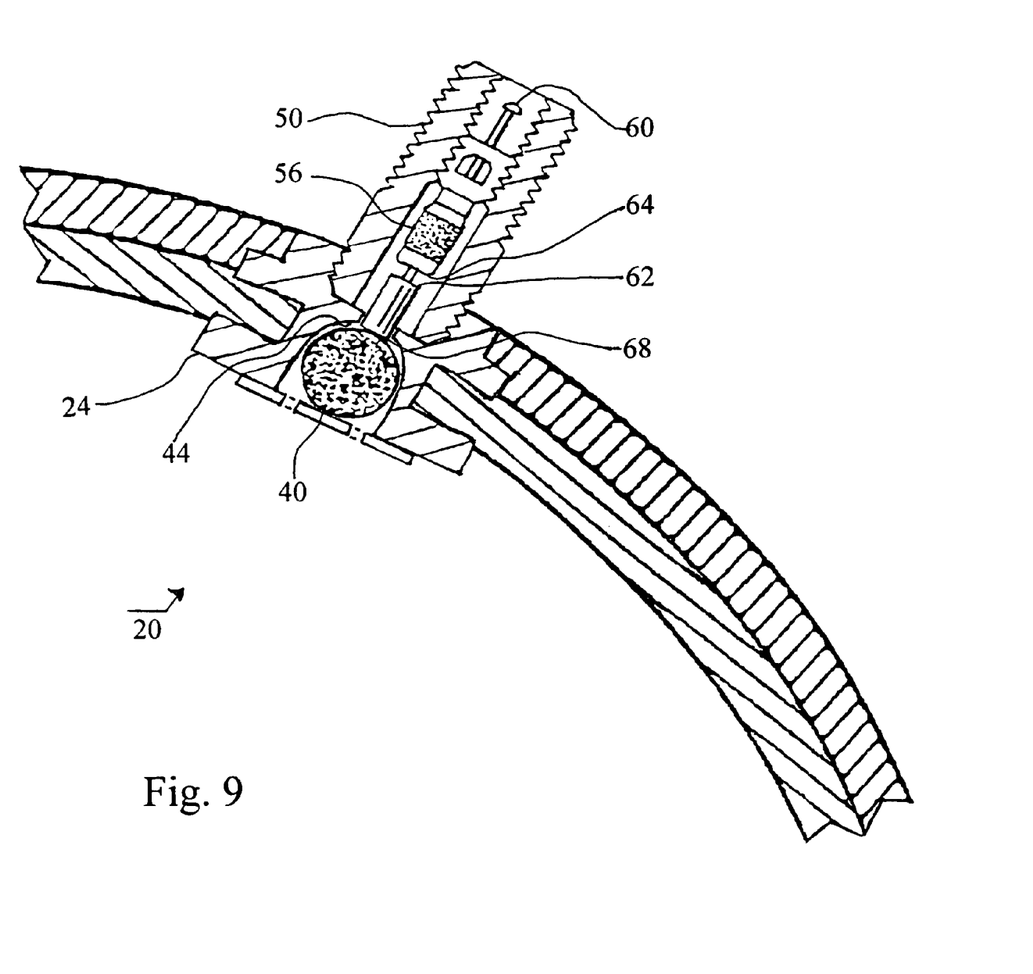
FIG. 9 is a sectional view similar to FIG. 8 showing the stem of the service valve depressed.

FIG. 9 is a sectional view similar to FIG. 8 showing the stem 60 of service valve 50 depressed. This action is usually achieved automatically by the pin of an air supply chuck when it is pressed on service valve 50. The action unseats seal 62 from its seat 64 allowing air to pass through Schrader valve 56 and service valve 50. In the process, the bottom end 66 of Schrader valve 56 pushes the ball 40 of one-way valve 24 away from its seat 44 allowing air to pass through the one-way valve. Service valve 50 thereby provides a means for selectively opening one-way valve 24 so that inflation or deflation of safety liner 20 is possible through a supply or vacuum hose.

FIG. 10 is a cross-sectional view of a vehicle tire 500 partially installed on tire rim 502. An enlarged view of compressed safety liner 20 along line 10-10 of FIG. 5 is shown installed in internal cavity 503. It is noted that by positioning one-way valve 24 in the location described in FIGS. 2-4, service valve 50 is accessible. Service valve 50 serves as a means for stopping air from entering safety liner 20. Once service valve 50 is removed from one-way valve 24, safety liner 20 starts to return slowly to its toroidal shape and the second bead of vehicle tire 500 can be installed on the rim.

Figure 11:
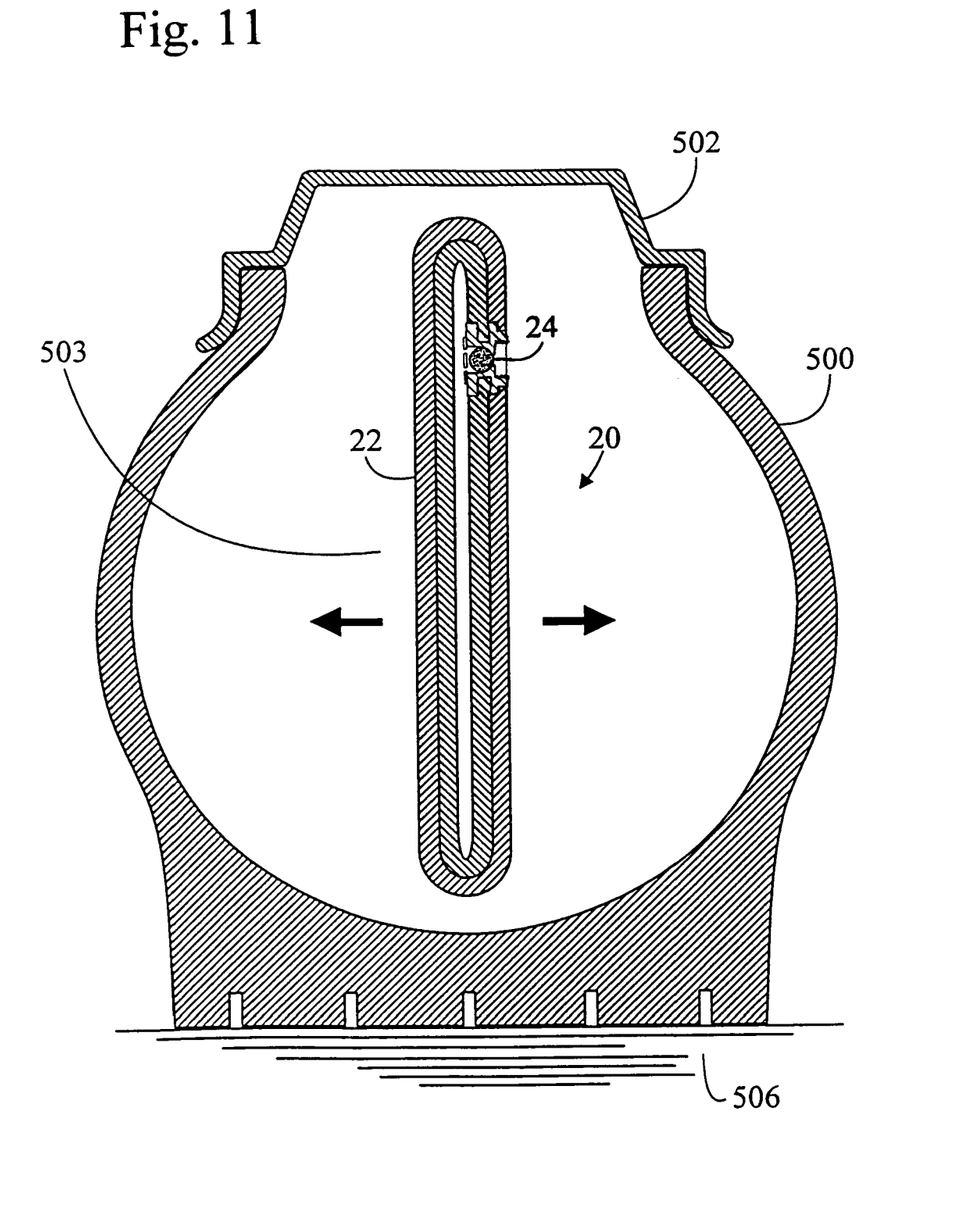
FIG. 11 is a cross-sectional view of a vehicle tire completely installed on a tire rim with the compressed safety liner inside.

FIG. 11 is a cross-sectional view of a vehicle tire 500 completely installed on tire rim 502. Safety liner 20 is now able to expand due to its resilience as shown by the arrows with air entering into the safety liner through one-way valve 24.

Figure 12:
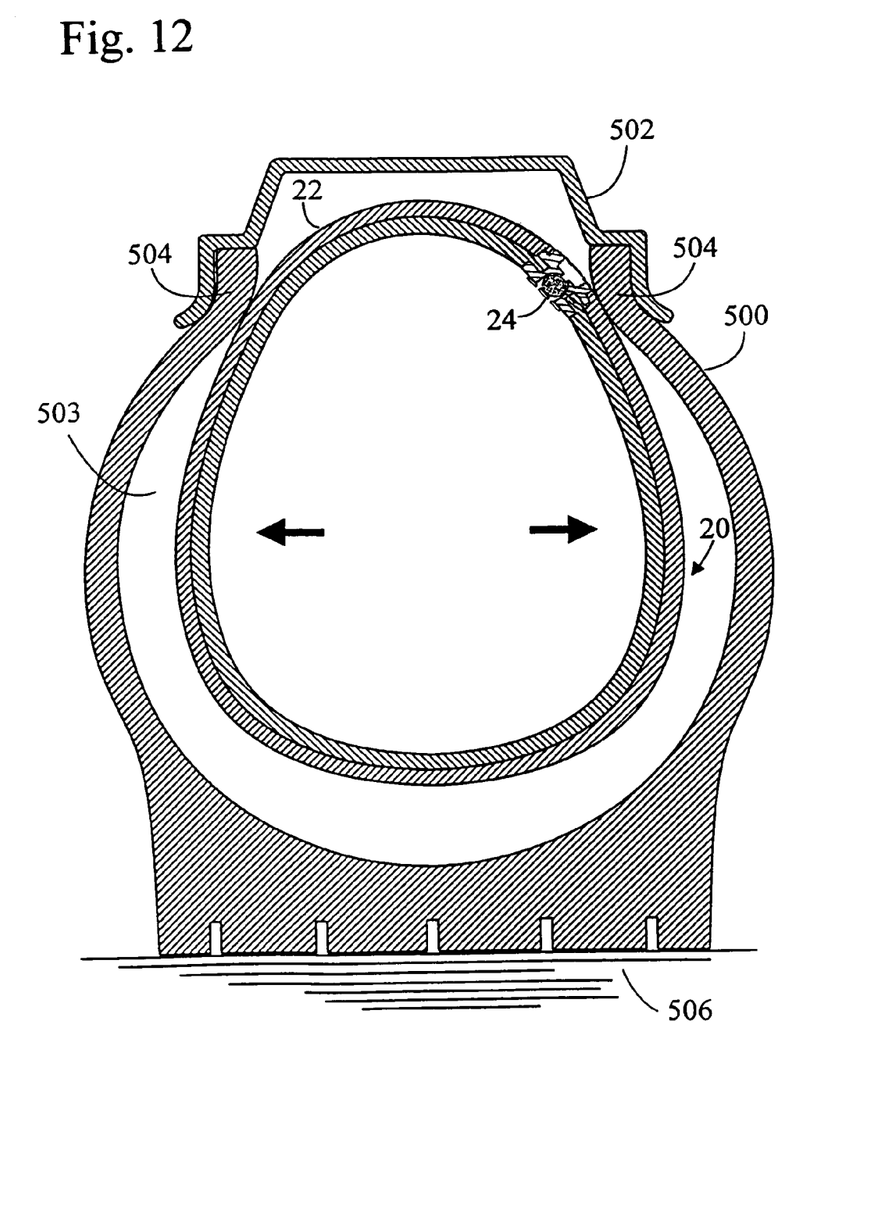
FIG. 12 is a cross-sectional view of the vehicle tire and tire rim with the safety liner expanded to partially fill the tire cavity.

FIG. 12 is a cross-sectional view of vehicle tire 500 and tire rim 502 with safety liner 20 expanded to its toroidal shape to loosely fill tire cavity 503. Safety liner 20 has stabilized at the internal tire pressure in its final toroidal shape. It is noted that when in the shown running condition, safety liner 20 does not entirely fill internal cavity 503 of vehicle tire 500, but rather abuts tire beads 504. If safety liner 20 completely filled internal cavity 503, then a blowout could also damage safety liner 20.

Figure 13:
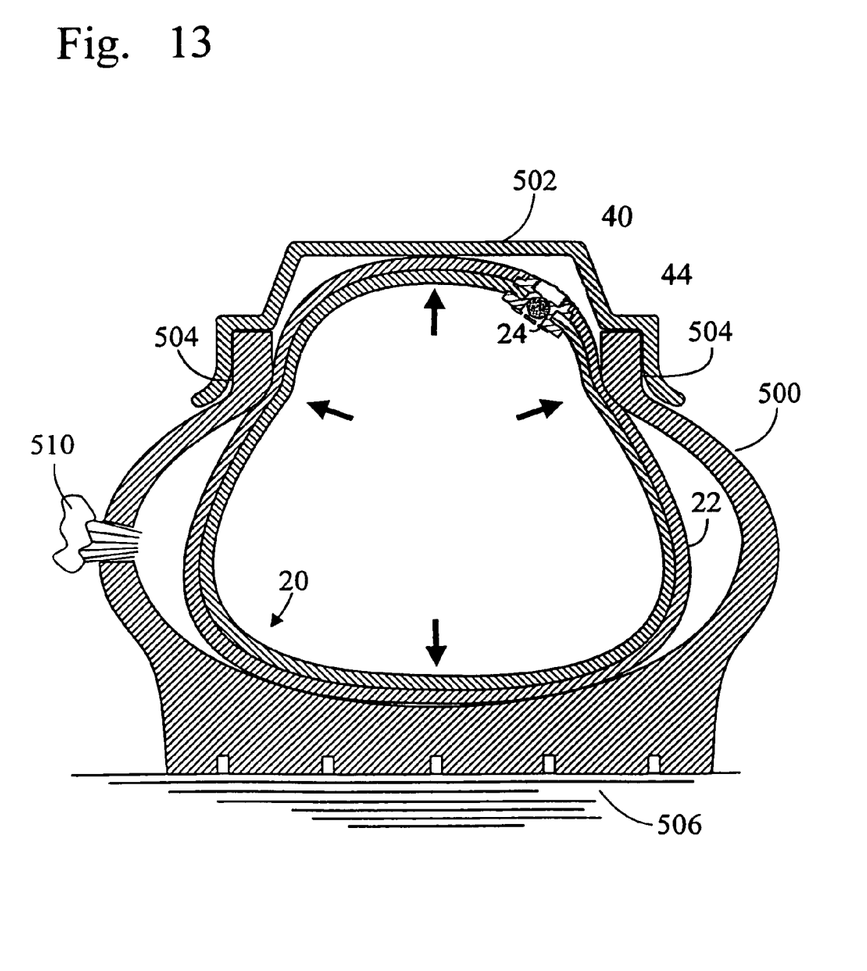
FIG. 13 is a cross-sectional view of the vehicle tire and safety liner after a blowout.

FIG. 13 is a cross-sectional view of vehicle tire 500 and safety liner 20 after a blowout or other leak. Substantially all the air inside safety liner 20 is prohibited from getting out by one-way valve 24. Initially a small volume of air escaping through one-way valve 24 will force ball 40 against valve seat 44 which will stop additional air from flowing out. Safety liner 20 will support tubeless tire 500 at a reduced profile allowing the motorist time to become aware of the situation and drive to a service station. Safety liner 20 also serves to maintain tire beads 504 in abutting contact with tire rim 502 so the tire does not separate from the wheel rim.

Figure 14:
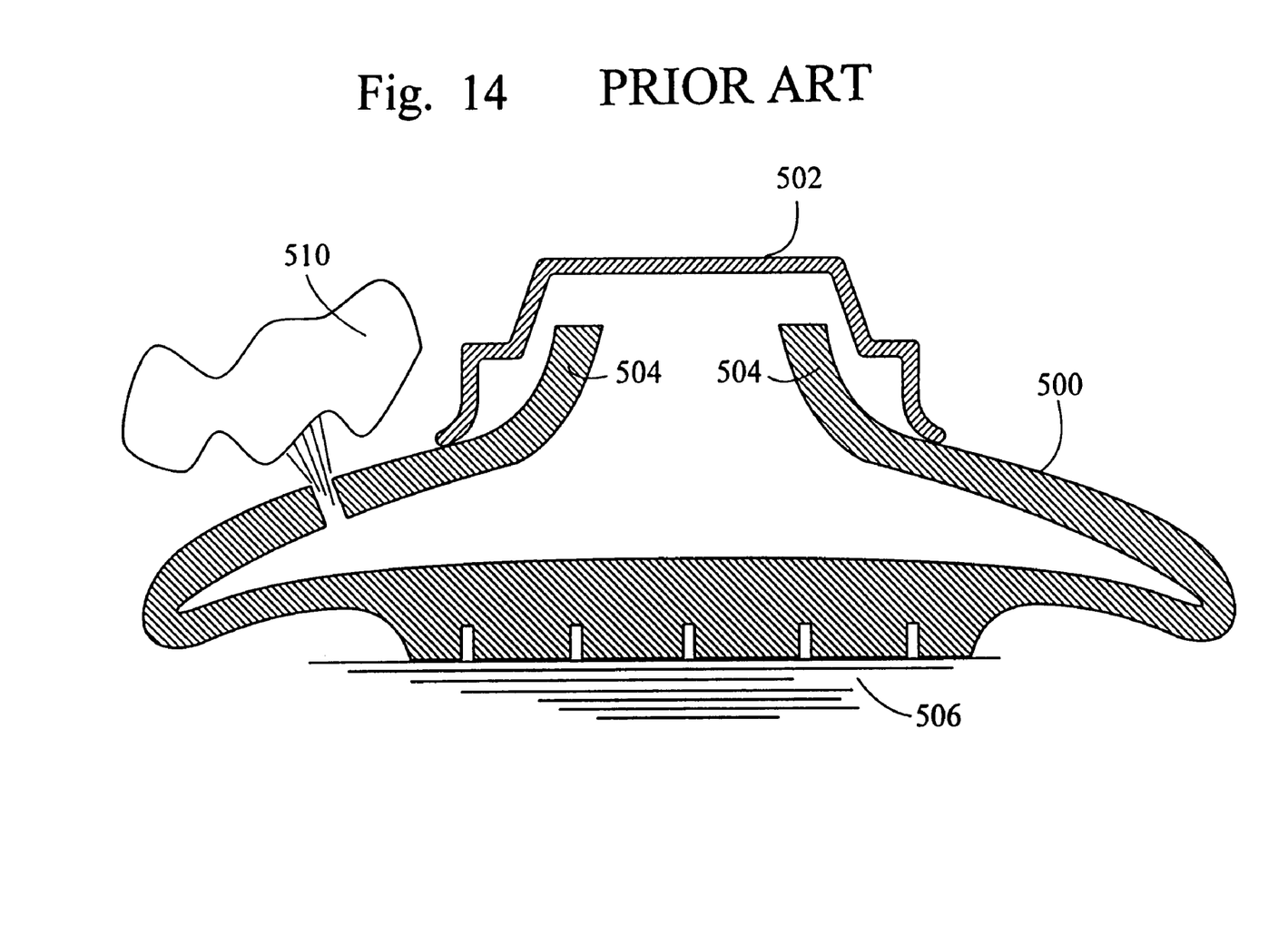
FIG. 14 is a cross-sectional view of a prior art vehicle tire without the safety liner after a blowout; and,
FIG. 15 is a view of a second embodiment.

FIG. 14 is a cross-sectional prior art view of a vehicle tire 500 without a safety liner during a blowout. Air 510 rapidly escapes from vehicle tire 500 causing the tire to deform and beads 504 to separate from tire rim 502.

Figure 15:
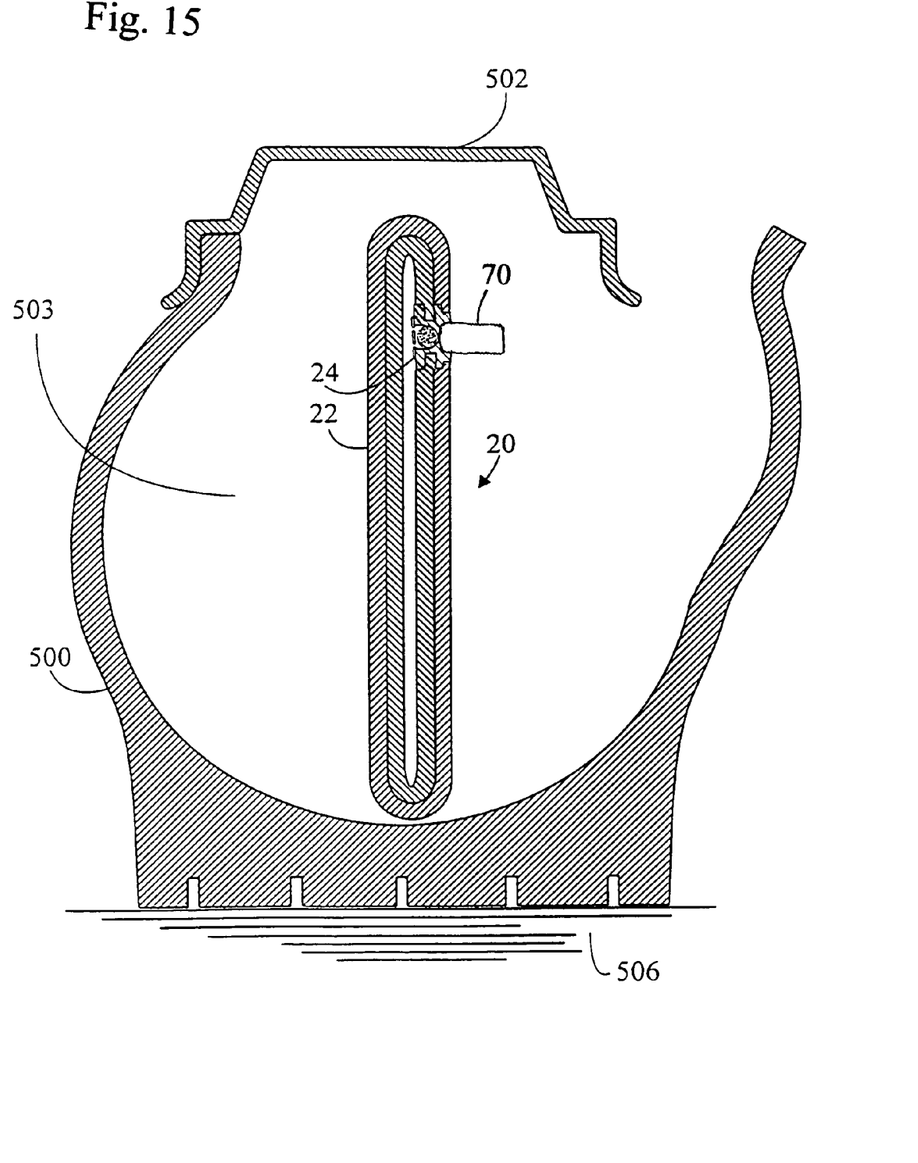

FIG. 15 is an alternative embodiment showing a plug 70 being used as a means for stopping movement of air into one-way valve 24 instead of a service valve 50. Plug 70 thereby keeps safety liner 20 compressed during assembly of the wheel by prohibiting air from entering through one-way valve 24. Before the second bead of the tubeless tire 500 is forced over the wheel rim 502, plug 70 is removed allowing air to slowly enter.

In terms of use, a method for mitigating the effects of a blow out or leak in a vehicle tire 500, comprises: providing a safety liner 20 having a tubular body 22 having a one-way valve 24, the tubular body 22 being compressible into a flattened substantially circular shape by a compressive force, and when the compressive force is removed, the tubular body 22 resiliently assuming a toroidal shape; providing a service valve 50, providing a vehicle tire 500 having an internal cavity 503, and, providing a tire rim 502; compressing body 22 into a flattened substantially circular shape; inserting the service valve 50 into the one-way valve 24, inserting the compressed tubular body 22 into the internal cavity 503 of the vehicle tire 500; removing the service valve 50; observing that the body tubular 22 commences to resiliently assume a toroidal shape; and, installing the vehicle tire 500 on the tire rim 502.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A safety liner for a vehicle tire, comprising:
   a hollow tubular body having a one-way valve into said body;
   air entering said tubular body through said one-way valve causing said tubular body to resiliently expand into a toroidal shape;
   when subjected to a compressive force, air being forced out of said tubular body when said one-way valve is kept from closing so that said tubular body assumes a flattened circular shape;
   a stop means in the form of a plug selectively installable into said one-way valve, so that when said tubular body is in said flattened circular shape, said stop means may be inserted into said one-way valve thereby preventing air from entering said tubular body and retaining said tubular body in said flattened circular shape;

when said tubular body is in said flattened circular shape and when said stop means is removed from said one-way valve, air enters said tubular body through said one-way valve, thereby allowing said tubular body to assume said toroidal shape; and, said safety liner insertable into the vehicle tire in said flattened circular shape, and thence expanding to said toroidal shape upon removal of said stop means, so that when the vehicle tire experiences a blow out, said safety liner remains inflated.

2. A safety liner for a vehicle tire, comprising:

a hollow tubular body having a one-way valve into said body;

air entering said tubular body through said one-way valve causing said tubular body to resiliently expand into a toroidal shape;

when subjected to a compressive force, air being forced out of said tubular body when said one-way valve is kept from closing so that said tubular body assumes a flattened circular shape;

a stop means in the form of a service valve selectively installable into said one-way valve, so that when said tubular body is in said flattened circular shape, said stop means may be inserted into said one-way valve thereby preventing air from entering said tubular body and retaining said tubular body in said flattened circular shape;

when said tubular body is in said flattened circular shape and when said stop means is removed from said one-way valve, air enters said tubular body through said one-way valve, thereby allowing said tubular body to assume said toroidal shape; and, said safety liner insertable into the vehicle tire in said flattened circular shape, and thence expanding to said toroidal shape upon removal of said stop means, so that when the vehicle tire experiences a blow out, said safety liner remains inflated.

3. A safety liner for a vehicle tire, comprising:

a hollow tubular body having a one-way valve into said body;

air entering said tubular body through said one-way valve causing said tubular body to resiliently expand into a toroidal shape;

a service valve selectively installed in said one-way valve and having a means for selectively opening said one-way valve;

when said service valve selectively opens said one-way valve and is connected to a vacuum, air inside said tubular body is sucked out of said tubular body causing said tubular body to assume a flattened circular shape;

when said service valve selectively does not open said one-way valve and said tubular body is in said flattened circular shape, said service valve prevents air from entering said tubular body thereby retaining said tubular body in said flattened circular shape;

when said tubular body is in said flattened circular shape and when said service valve is removed from said one-way valve, air enters said tubular body through said one-way valve, thereby allowing said tubular body to assume said toroidal shape; and, said safety liner insertable into the vehicle tire in said flattened circular shape, and thence expanding to said toroidal shape upon removal of said service valve, so that when the vehicle tire experiences a blow out, said safety liner remains inflated.

4. A safety liner according to claim 3, the vehicle tire having an internal cavity, said safety liner further including:

when in said toroidal shape, said tubular body shaped and dimensioned to circumferentially fit inside the vehicle tire only partially filling the internal cavity so that a blow out of the vehicle tire will not damage said safety liner.

5. A safety liner according to claim 3, the vehicle tire having an internal cavity, said safety liner further including:

said body including abutting layers of rubber and tire casing fabric.

6. A safety liner according to claim 3, further including:

when in said toroidal shape, said tubular body having an inside portion; and, said one-way valve disposed on said inside portion.

7. A safety liner according to claim 3, further including:

said tubular body having an outer surface; and, said one-way valve having an outer end substantially flush with said outer surface.

8. A method for mitigating the effects of a leak in a vehicle tire, comprising:

providing a tubular body having a one-way valve into said tubular body, said body compressible into a flattened circular shape by a compressive force, and when said compressive force is removed, said body resiliently assuming a toroidal shape;

providing a stop means for closing said one-way valve;

providing a vehicle tire having an internal cavity;

providing a tire rim;

holding said one-way valve open so that air may pass out of said tubular body;

compressing said tubular body into a flattened circular shape;

inserting said stop means into said one way-valve to keep air from entering said tubular body;

inserting said compressed tubular body into said internal cavity of said vehicle tire;

removing said stop means; and, installing said vehicle tire on said tire rim.

9. A method for mitigating the effects of a leak in a vehicle tire, comprising:

providing a tubular body having a one-way valve into said tubular body, said body compressible into a flattened circular shape by a compressive force, and when said compressive force is removed, said body resiliently assuming a toroidal shape;

providing a service valve for selectively closing said one-way valve and having a means for selectively opening said one-way valve;

providing a vehicle tire having an internal cavity;

providing a tire rim;

inserting said service valve into said one-way valve;

opening said service valve and said one-way valve;

applying a vacuum to said service valve to suck the air inside said tubular body out until said tubular body is in a flattened circular shape;

closing said service valve to keep air from entering said tubular body;

inserting said compressed tubular body into said internal cavity of said vehicle tire;

removing said service valve; and, installing said vehicle tire on said tire rim.

* * * * *